United States Patent [19]
Evans

[11] Patent Number: 5,077,955
[45] Date of Patent: Jan. 7, 1992

[54] CHUB PACKAGING MACHINE CLIPPING MECHANISM

[75] Inventor: Alfred J. Evans, Raleigh, N.C.

[73] Assignee: Delaware Capital Formation, Inc., Apex, N.C.

[21] Appl. No.: 601,322

[22] Filed: Oct. 22, 1990

[51] Int. Cl.[5] .......................................... B65B 51/05
[52] U.S. Cl. .............................. 53/138.4; 29/243.57
[58] Field of Search ............... 53/138.4, 138.3, 139.1; 29/243.56, 243.57

[56] References Cited

U.S. PATENT DOCUMENTS

| | | | |
|---|---|---|---|
| 3,717,972 | 2/1973 | Niedecker | 53/138.4 |
| 4,001,926 | 3/1976 | Velarde | 29/243.56 |
| 4,043,011 | 8/1977 | Giraud | 53/138.4 |
| 4,109,363 | 8/1978 | Velarde | 53/138.4 |
| 4,675,945 | 1/1985 | Evans | 29/243.5 |
| 4,766,713 | 7/1987 | Evans | 53/138.4 |

FOREIGN PATENT DOCUMENTS

2711430 9/1978 Fed. Rep. of Germany ..... 53/138.4

Primary Examiner—John Sipos
Attorney, Agent, or Firm—Allegretti & Witcoff, Ltd.

[57] ABSTRACT

A clip applying machine for tubular casings which comprises opposing clip jaw members that pivot toward each other to gather the casing and position a die member on one side of the casing. A punch member is advanced from the other side of the casing to feed a clip around the casing and against the die member. The jaw members are pivoted by a first piston/cylinder mechanism which is pivotally connected to the jaw members and the punch is advanced by a second piston positioned within the first piston. In this manner the punch and the second piston are driven in two stages, i.e. first by and with the first piston and then by air pressure that directly and further advances the second piston.

12 Claims, 10 Drawing Sheets

CHUB PACKAGING MACHINE CLIPPING MECHANISM

BACKGROUND OF THE INVENTION

This invention relates in part to packaging machinery, and more particularly to packaging machines for food processing, such as stuffing machines of the type which make sausage chubs and similar stuffed meat and stuffed food products. Most particularly, this invention relates to an improved clipping mechanism in and for a chub forming machine.

Sausage making and the making of similar stuffed meat and food products has become highly automated. As a result of significant, valuable research in the United States, a variety of machines have been successfully developed for the automated and semiautomated production of chubs from processed meats and casing. One such machine is disclosed in U.S. Pat. No. 4,766,713, issued on Aug. 30, 1988 to Alfred J. Evans, for a Packaging Device Including Dual Clip Attachment Apparatus, incorporated by reference. In a machine such as that disclosed in the identified patent, sausage material is pumped from a vat to a stuffing horn assembly. Shirred casing is applied over the end of a stuffing horn. The casing and material pumped to the horn leave the horn simultaneously, through a casing brake. The stuffing material fills the casing and the casing maintains the material under slight pressure. The casing brake permits the casing to exit under uniform tension. Adjacent the casing brake, dual product clippers intermittently acts to void sections of the casing which have passed, the brake, into voided "rope" sections. The clippers clip each rope section to define the end of an exiting chub and the beginning of the next chub.

Other notable machines are disclosed in U.S. Pat. No. 4,675,945 issued on June 30, 1987 to Alfred Evans et al., U.S. patent application Ser. No. 251,667 filed Sept. 29, 1988, allowed now U.S. Pat. No. 4,847,953, and a U.S. patent application filed May 17, 1989 in the names of Alfred J. Evans and R. Clay Dunigan entitled Improved Semi-Automatic Stuffing Machine, Casing Brake and Turret Assembly, Allegretti & Witcoff, Ltd. application Ser. No. 352,885 now abandoned, all incorporated by reference. In the machines of the identified patent and applications, clipping mechanisms are provided for supplying and deforming metal clips about the voided casing.

While the machines of U.S. Pat. No. 4,766,713 and the other identified patents have proven highly desirable, continued advances have been desired in clipping mechanisms, to decrease the size of the mechanisms, reduce the number of parts of the mechanisms, simplify adjustments of the mechanisms, dramatically reduce the air volume and pressure requirements of the mechanisms, extend the life of the mechanisms, and package the mechanisms into self-contained units.

SUMMARY OF THE INVENTION

In and for a chub packaging machine, the invention is directed, in a principal aspect, to an improved clipping mechanism comprising a support structure, first and second piston members, clip jaw members, a die member, mechanical link members, and pressurizing means such as a pneumatic source.

Filled tubular casing moves through the chub packaging machine. The path of movement of the filled tubular casing defines a longitudinal axis. This axis is a significant physical direction for understanding orientation of the structure of the invention.

The support structure of the invention defines a first cylinder, and the first cylinder extends in a direction which is transverse, relative to the longitudinal axis. Within the first cylinder, the first piston member moves transversely under force of pressure. A second cylinder is internal to the first piston, and it also extends in the transverse direction. A second piston member is located in the second cylinder. The second piston member is also movable transversely, in the second cylinder, under force of pressure.

The clip jaw members are pivotally mounted to the support structure for pivoting relative to the support structure toward each other, to and from a closed position. A die member for clip deformation is located on one of the clip jaw members. The mechanical link members are pivotally mounted to the first piston member, for movement with the first piston member, and pivotally attached to the clip jaw members, for driving the pivoting of the clip jaw members relative to the support structure. Thus, transverse movement of the first piston under force of pressure pivots the clip jaw members closed.

A punch is affixed to the second poston member, for transverse movement with the second piston member, into and out of cooperative interaction with the die member while the clip jaw members are in the closed position.

The pressurizing means pressurizes the first and second cylinders in coordination, to move the first and second pistons in the first and second cylinders in coordination, to advance the clip jaw members to the closed position, and thereafter to drive the punch into cooperative interaction with the die. Clips fed successively to the mechanism are driven under action of the punch around successive rope sections of the filled tubular casing and deformed to clip the rope sections. The clip jaw members and punch are intermittently retracted during passage of filled tubular casing along the path of movement, to provide for movement of the filled tubular casing.

This principal aspect and other principal aspects of the invention are more full appreciated by a reading of the detailed description of the preferred embodiment of the invention, which follows.

BRIEF DESCRIPTION OF THE DRAWING

The accompanying drawing illustrates the preferred embodiment of the invention. The machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

The description which follows refers to the componentry of the machine in such spatial terms as "front", "rear", "upper", "lower", "left", "right", etc. Terms such as these, which depend of the specific spatial orientation of the components, are intended for the aid of the reader, and except as incorporated into the claims, not as a limitation on the possible orientation of components in any possible alternate, but covered, embodiment of the invention. Except as consistent with the law of claim interpretation, the drawing and following description are only illustrative of the invention.

For orientation of the reader to the drawing, and for ease of beginning of reading of the following detailed description, a brief description of the drawing is as follows.

DETAILED DESCRIPTION OF THE PREFERRED EMBODIMENT

Figure 1:
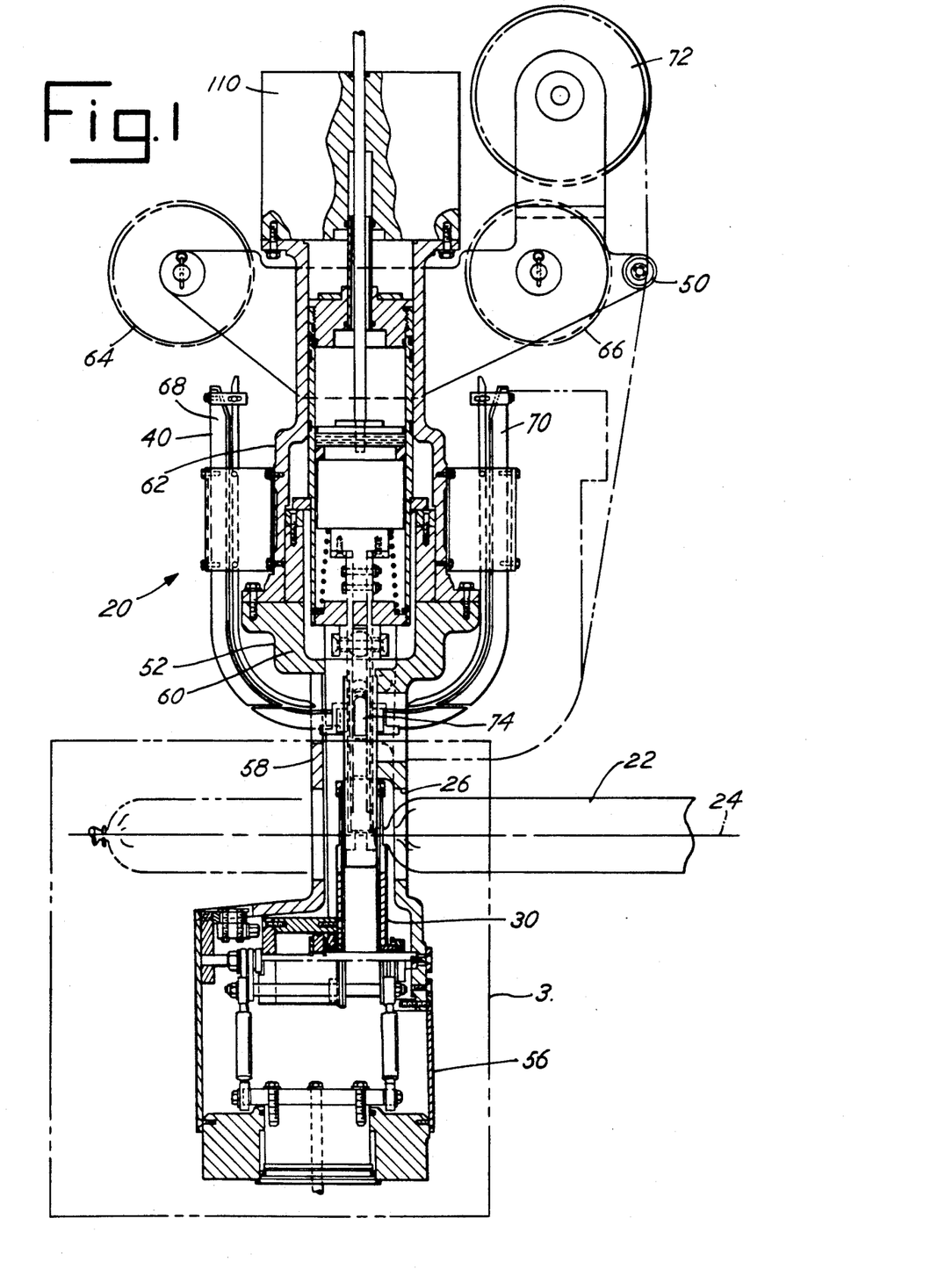
FIG. 1 is a cross-sectional view of the clipping mechanism which constitutes the preferred embodiment of the invention, taken along the longitudinal centerline of the clipping mechanism and splitting it in half, front to rear.
Figure 14:
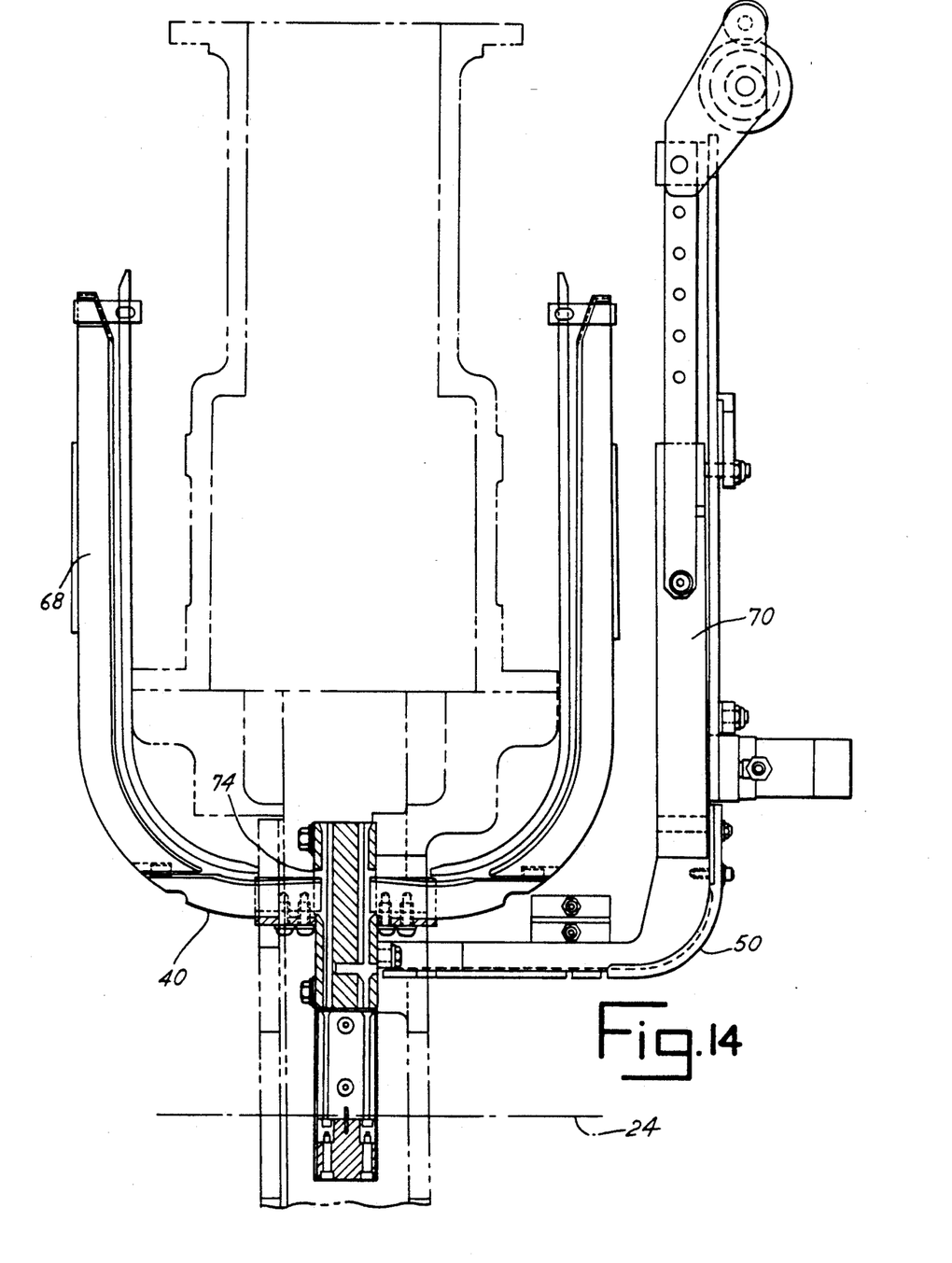
FIG. 14 is a partial cross-sectioned plan view of the feed mechanism of the preferred embodiment.

Referring to FIG. 1, the preferred form of the invention is embodied in a clipping mechanism generally designated 20. The mechanism 20 is positioned along the path of movement of filled tubular casing 22. The path of the casing 22 defines a longitudinal axis 24, and extends through a throat area 26 of the mechanism 20. The path of the casing is typically horizontal, and the mechanism 20 as preferred extends generally above the path. A voiding mechanism 30, not a part of the invention, accompanies the clipping mechanism 20 and extends below the path. A clip feed mechanism generally 40, as in FIGS. 1 and 14, and a loop feed mechanism 50, also as in FIGS. 1 and 14 also accompany the clipping mechanism 20.

Figure 2:
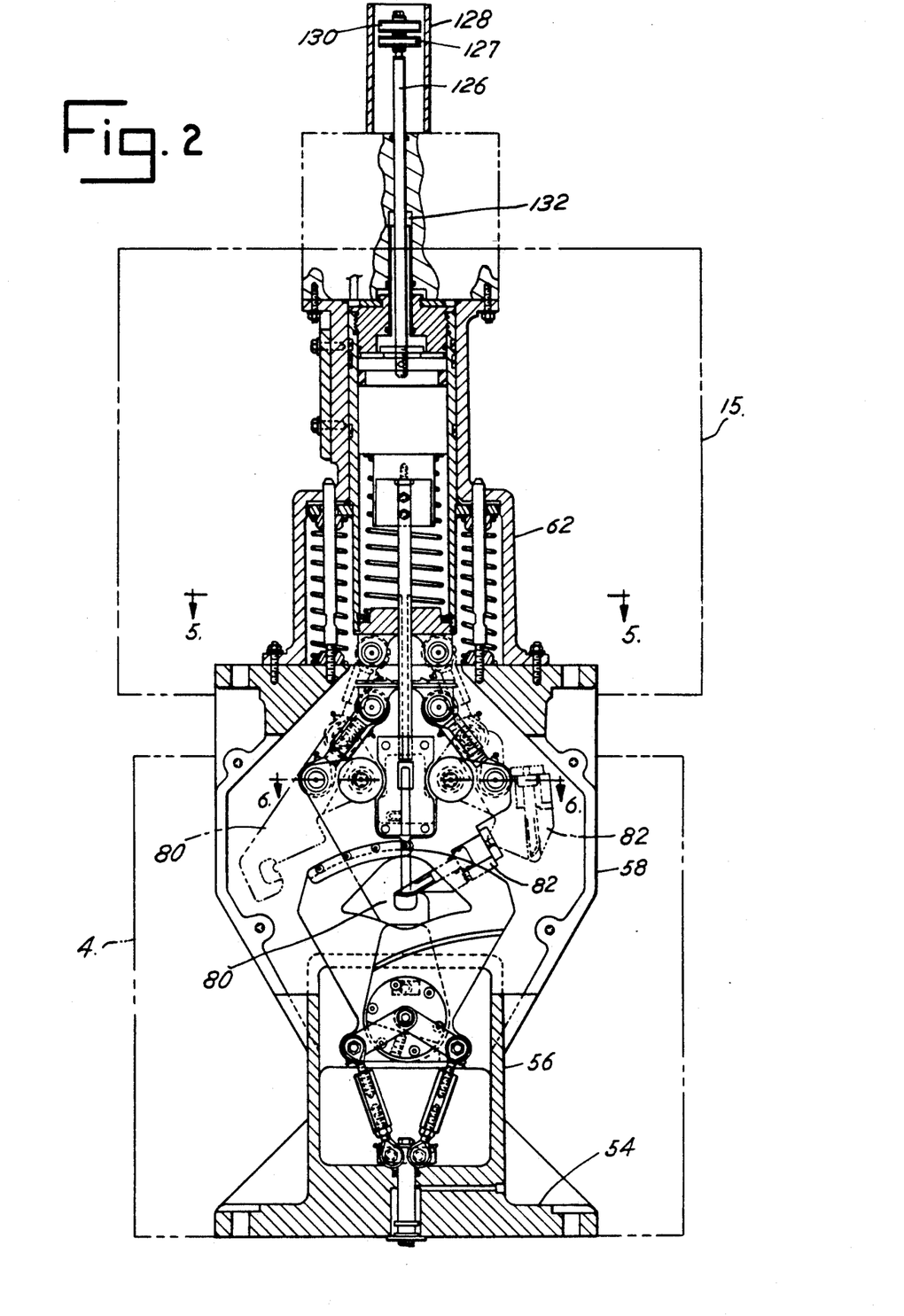
FIG. 2 is a cross-sectional view of the clipping mechanism, taken along the transverse centerline of the clipping mechanism from the left, or product discharge side of the mechanism, of the mechanism as in FIG. 1, illustrating both the closed and fully open positions of the clip jaws of the embodiment.
Figure 3:
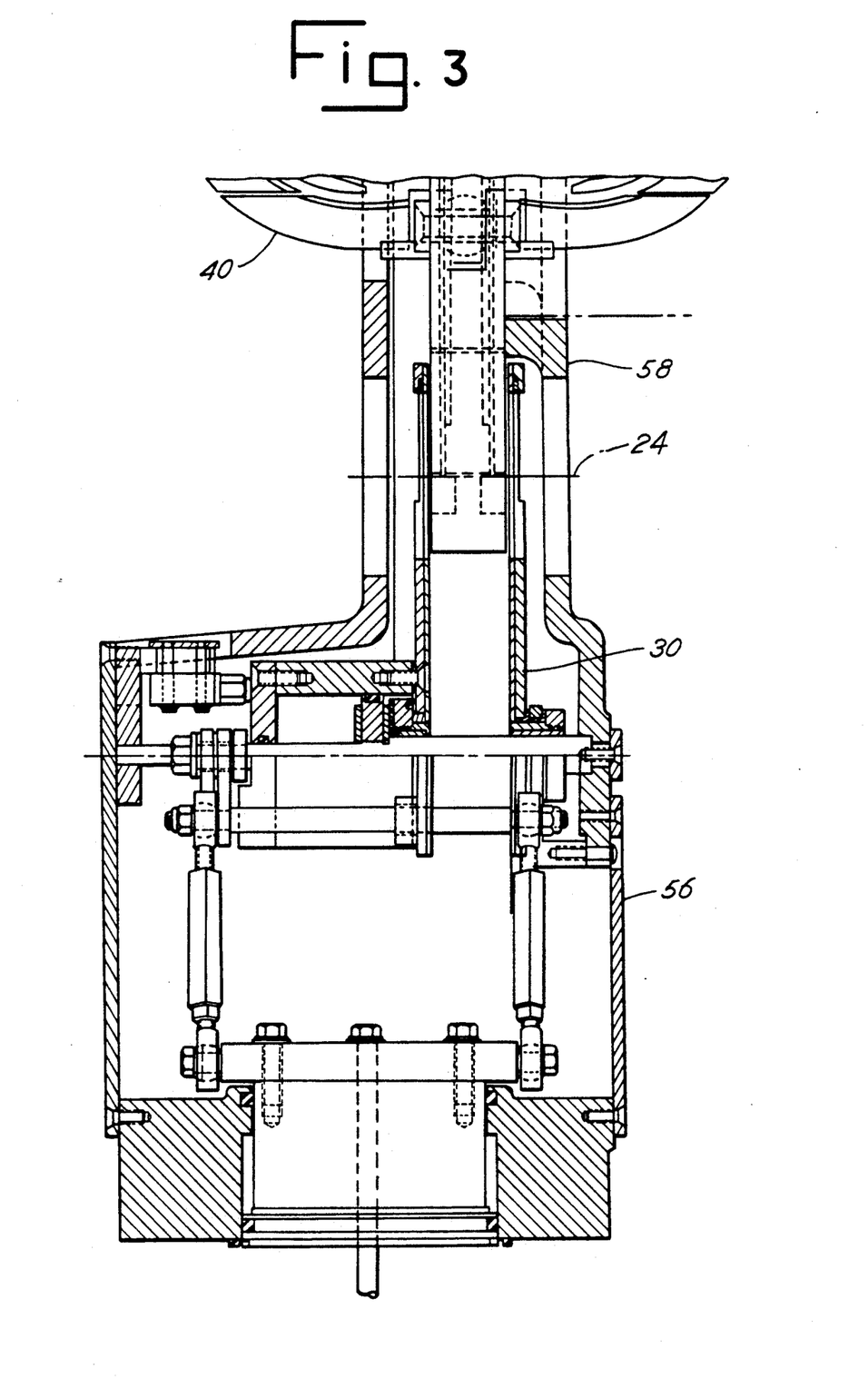
FIG. 3 is an enlarged, side sectional view of the structure in the area of box 3 in FIG. 1, including structure of an accompanying, separate invention.
Figure 4:
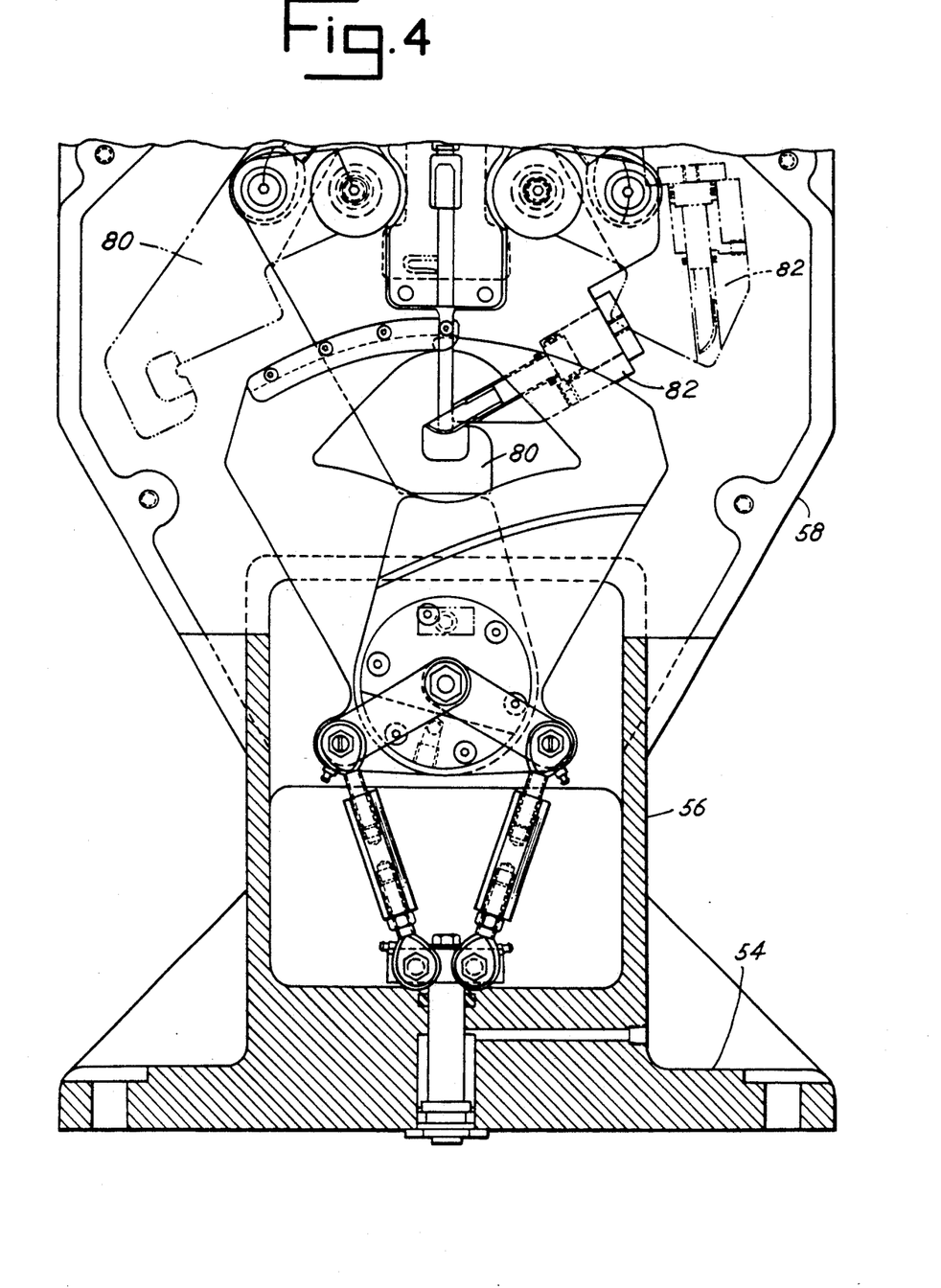
FIG. 4 is an enlarged, sectional view from the same direction as FIG. 2, in the area of box 4 in FIG. 2, again illustrating both the closed and the fully open positions of the clip jaws of the embodiment.
Figure 5:
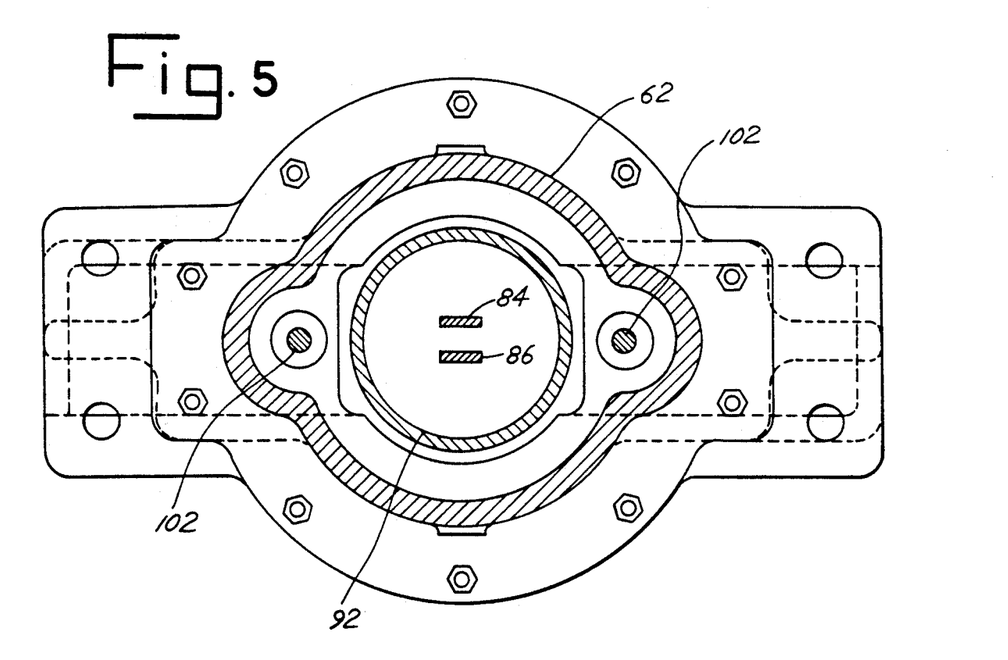
FIG. 5 is a cross-section taken along line 5—5 in FIG. 2.

Referring to FIGS. 1 and 2, the clipping mechanism 20 includes a main assembly within a main housing 52. A foot plate 54 provides for mounting of the clipping mechanism 20 where desired. Rising over the foot plate 54, a voider portion 56 of the housing 52 contains the voiding mechanism 30. Continuing upward, a longitudinally narrowed and transversely widened portion 58 of the housing 52 contains pivotal clip jaws, to be described. The main housing 52 terminates in a mounting lug 60.

An upper cylinder housing 62 contains an upper cylinder assembly. The upper cylinder housing 62 is fastened atop the main housing assembly 52. Clip reels 64, 66 and clip rails 68, 70 of the clip feed mechanism 40 are mounted to the sides of the upper cylinder housing 62. A loop reel 72 of the loop feed mechanism 50 is also mounted to the cylinder housing 62. Clips are fed from the reels 64, 66 onto the clip rails 68, 70 and by the rails 68, 70 to a clip window 74 in the portion 58 of the main housing 52.

Internally, the upper cylinder housing 62 opens into the main housing 52, through the central portion of the mounting lug 60.

Figure 15:
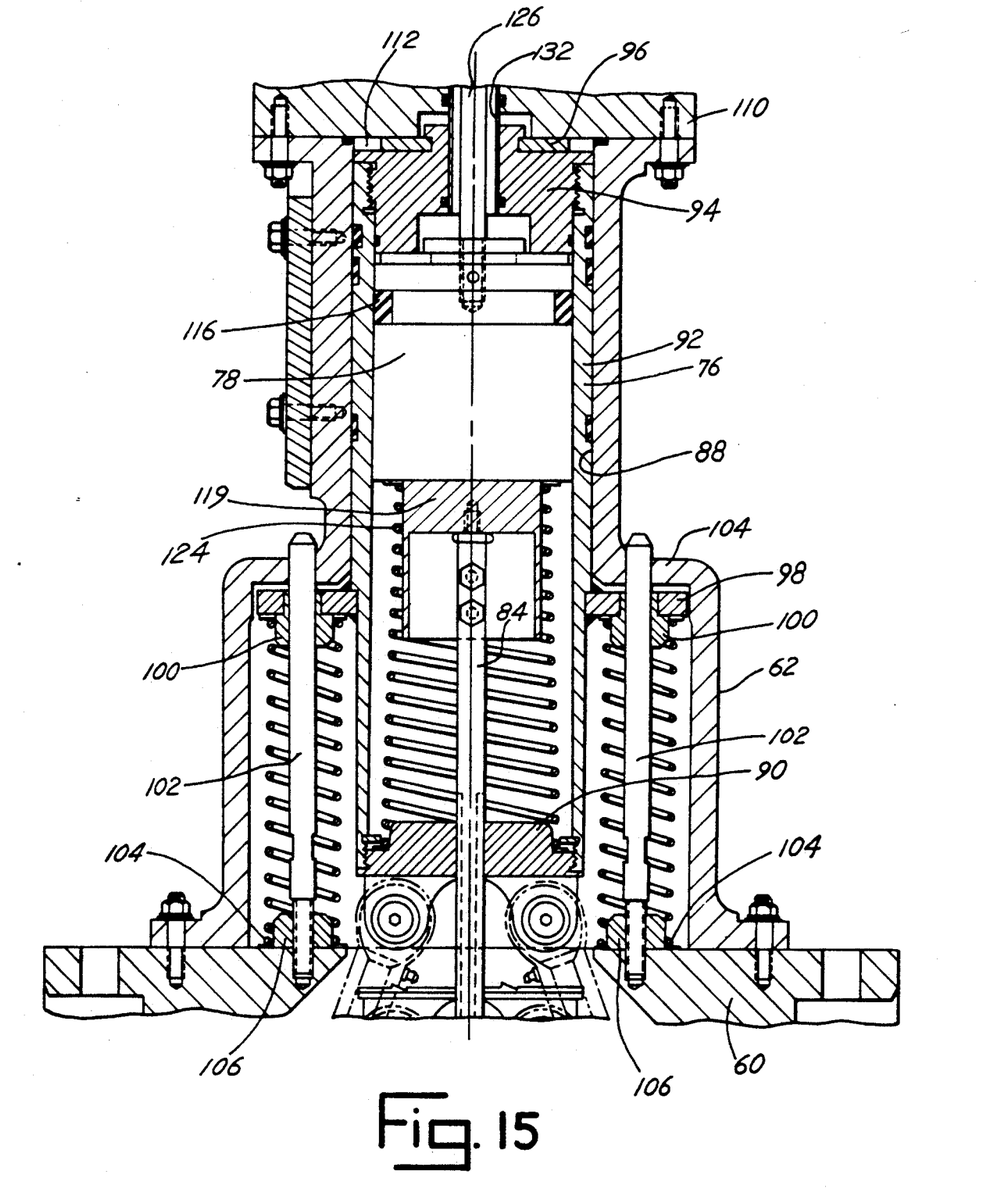
FIG. 15 is an enlarged, sectional view of the structure in the area of box 15 in FIG. 2, illustrating locations of punch and clip jaw driving pistons for the retracted position of the clip jaws and punches.
Figure 16:
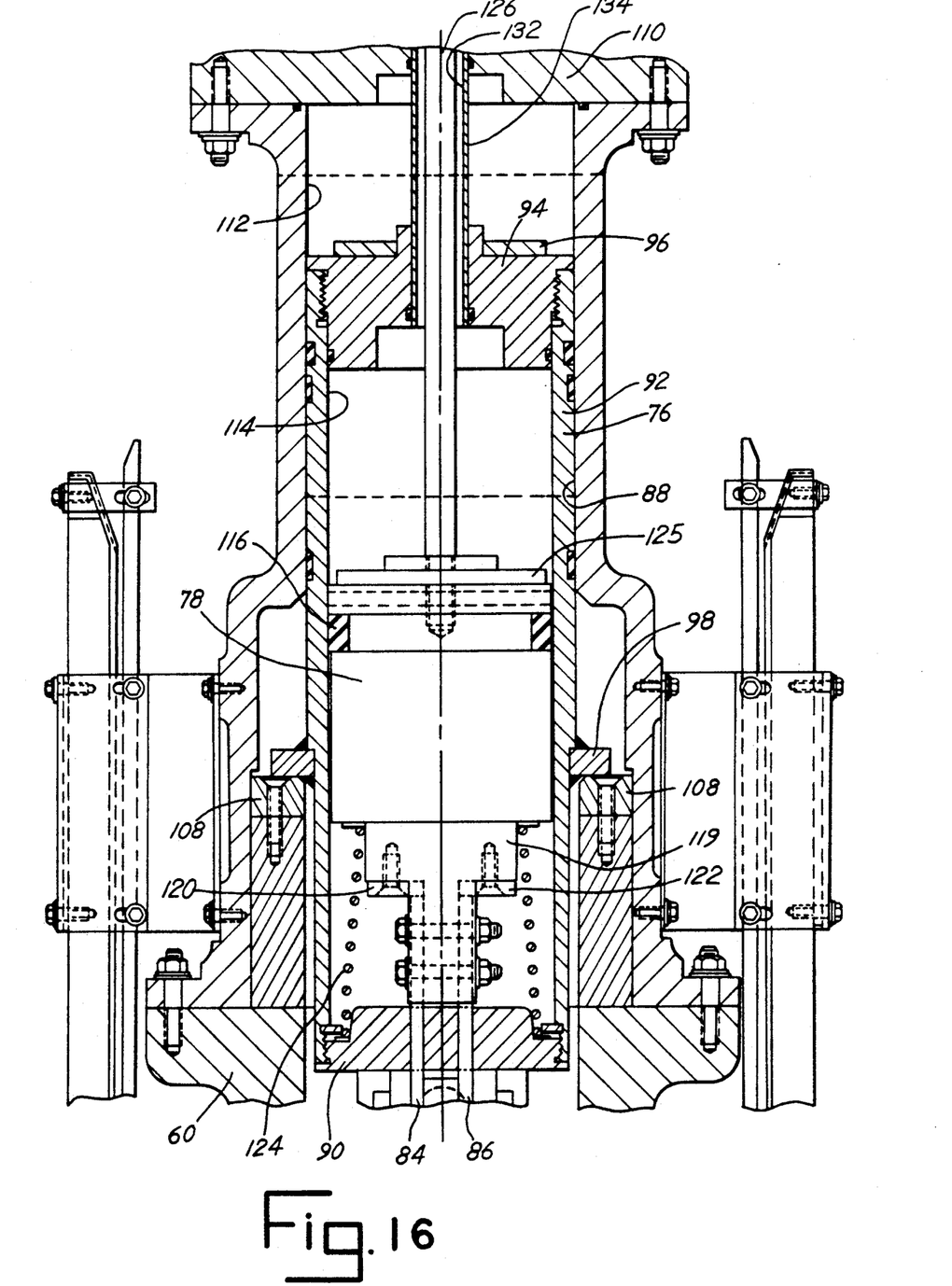
FIG. 16 is an enlarged, side sectional view of the same structure as in FIG. 15, illustrating locations of driving pistons for the advanced positions of the clip jaws and punches.

Briefly, with reference to FIGS. 15 and 16, and with detail to follow, a pair of pneumatically driven pistons 76, 78 in the upper cylinder assembly drive pivotal clip jaws 80, 82, shown in FIGS. 2, 4 and 7-13, in the main assembly and punches 84, 86, which move through the housings 62, 52. The pistons 76, 78 drive the jaws 80, 82 and punches 84, 86 in a coordinated motion, into and out of the throat area 26. With each movement into the throat area, the jaws close and the punches advance, driving clips against dies on the jaws, and deforming the clips around rope sections of the filled tubular casing.

Referring again to FIGS. 15 and 16, the first piston 76 is located in a first cylinder 88, defined within the upper cylinder housing 62. The cylinder 88 extends transversely to the axis 24. The piston 76 is comprised of a first connector plug 90, an elongated, annular wall 92, a second connector plug 94, an annular bumper 96, a flange 98, and spring pilots 100.

As shown by comparison of FIGS. 15 and 16, the first piston 76 is advanced and retracted within the first cylinder 88. The retracted, or "stand-by", position of FIG. 15 retracts the clip jaws 80, 82 and punches 84, 86. The advanced or clipping, position of FIG. 16, advances the clip jaws 80, 82, and partially advances the punches 84, 86. The linearity of the motion of the first piston 76 is controlled by two guide pins 102, fastened to the mounting lug 60 and extending transversely into the upper cylinder housing 62. The guide pins pass through guide pin openings in the spring pilots 100 and flange 98. The guide pins also pass through a wall section 104 of the housing 62, to orient assembly of the housing 62 to the lug 60.

Advancement of the piston 76 occurs under action of pneumatic pressure from a pneumatic manifold 110. An air transfer port opens from the manifold 110 into the space 112 above the piston 76. Pressurized air through this port drives the piston 76.

Return of the piston 76 to the retracted position occurs under action of helical springs 104, on venting of the port. The springs 104 are located along the pins 102, with ends positioned on spring pilots 100 and 106. The springs 104 are compressed during advancement of the piston 76, and recoil to return the piston 76. Advancement of the piston 76 terminates on contact of the flange 98 with bumpers 108 inside the housing 62, as in FIG. 16, and retraction terminates on contact of the bumper 96 with the wall of the pneumatic manifold 110.

The second piston 78 is located within a second cylinder 114, designated in FIG. 16, defined within the first piston 76 by its elongated, annular wall 92 and connector plugs 90, 94. A seal 116 is located in a recess of the piston 78 for sealing against the inner surface of the wall 92. Punches 84, 86 are affixed to an extension 119 of the piston 78, with punch thrust plates 120, 122 interposed, in the transverse direction, between the punches 84, 86 and piston extension. The piston extension also pilots a helical return spring 124, as does the connector plug 90 of the first piston 76. Partial advancement of the second piston 78 occurs by advancement of the first piston 76. Advancement is completed under action of air pressure from the manifold 110. A connecting rod 126 extends from above the manifold, as seen in FIG. 1, through the manifold 110 and to the piston 78. The rod 126 is surmounted by an adjustable crimp stop 127 with an associated guard 128 and lock 130, for fine adjustment of the position of termination of advancement of the piston 78. The crimp stop 127 and lock 130 are in the nature of two lock nuts. Actual driving of the piston 78 occurs on introduction of pressurized air into the air transfer tube 132 of the manifold 110, and sleeve 134 of the first piston 76, best seen in FIG. 16.

Retraction of the piston 78 occurs on recoil of the spring 124. A bumper 125 limits retraction within the cylinder 114.

Advancement of the second piston 78 in two stages, (a) first by advancement of the first piston 76 (the second piston "riding along"), followed by (b) advancement under air pressure from the manifold 110, provides for a timed full advancement of the clip jaws 80, 82 before full advancement of the punches 84, 86. The clip jaws advance into readiness for full advance of clips by advancement of the punches. Partial advancement of the second piston 78 by advancement of the first piston 76 also economizes pressurized air requirements.

Figure 7:
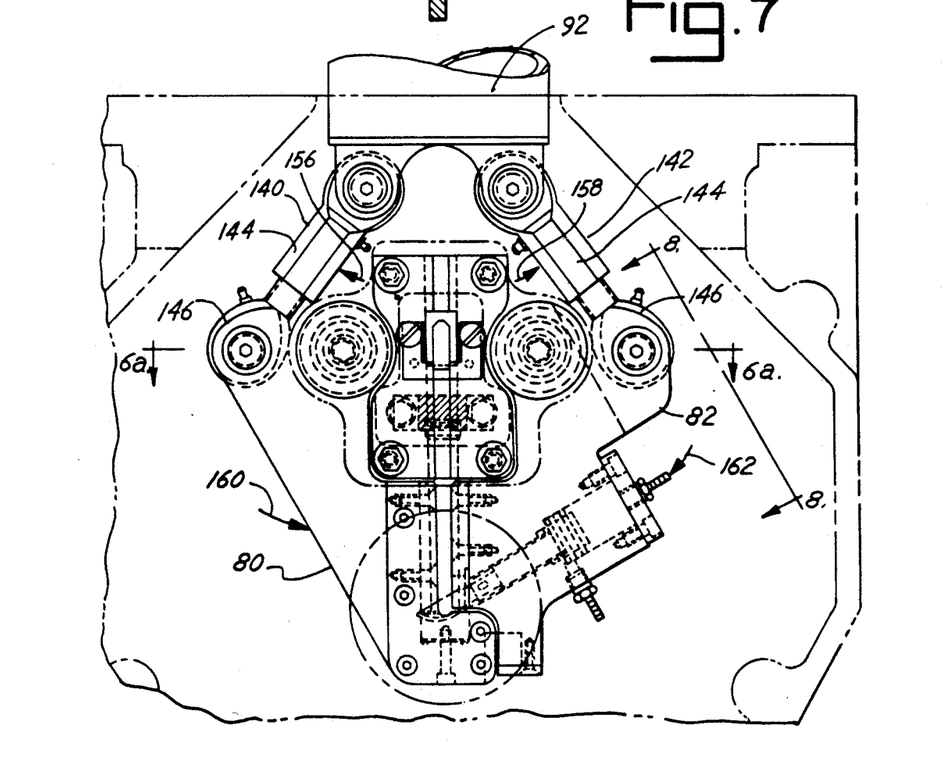
FIG. 7 is a partial view, similar to FIG. 2, depicting the clip jaws of the preferred embodiment in a closed, clipping, position.
Figures 8, 9, 10, 11, 12, 13:
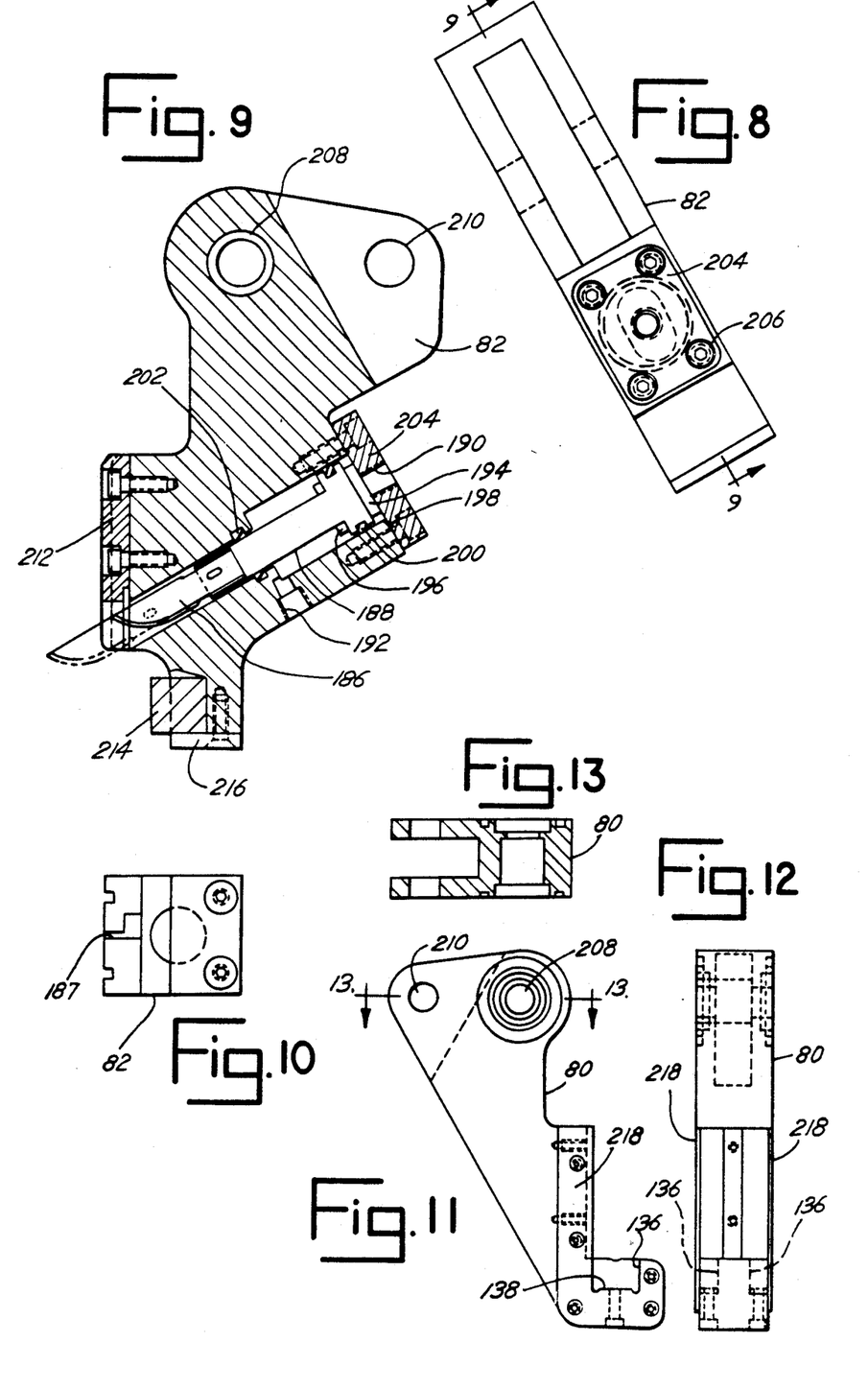
FIG. 8 is a view of a clip jaw of the preferred embodiment, taken along line 8—8 of FIG. 7.
FIG. 9 is a cross-sectional view of the clip jaw of FIG. 8, taken along line 9—9 of FIG. 8.
FIG. 10 is an isometric view of the bottom of the clip jaw of FIG. 9.
FIG. 11 is a side elevation view of the clip jaw other than the clip jaw of FIGS. 8, 9 and 10.
FIG. 12 is an isometric view of the side of the clip jaw of FIG. 11.
FIG. 13 is an isometric view of the top of the clip jaw of FIG. 11.

Referring to FIG. 7, clip jaws 80, 82 meet in the advanced position to define punch channels for guidance of the punches 84, 86. Referring to FIGS. 11 and 12, the clip jaw 80 defines die pockets 136 with dies such as 138 therein. The dies crimp clips driven into the dies by the punches.

Figure 6:
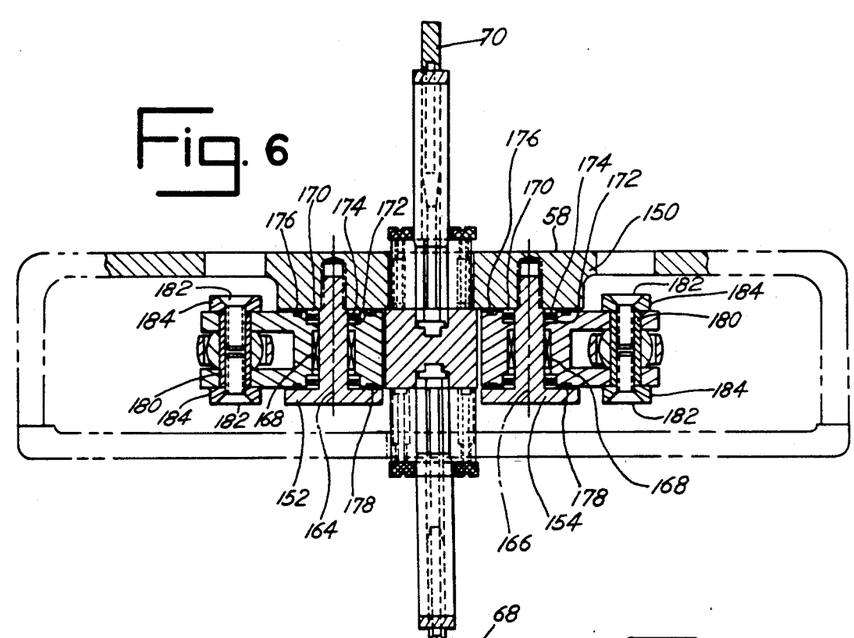
FIG. 6 is a cross-section taken along line 6—6 in FIG. 2.

Referring again to FIG. 7, the clip jaws 80, 82 are linked by links 140, 142 each comprised of telescoping link members 144, 146 to the first piston 92. Referring to FIG. 6 as well as FIG. 7, the clip jaws 80, 82 are also pinned against an internal mounting boss 150 of the portion 58 of the housing 52. (As stated in the Brief Description of the Drawing, FIG. 6 is a cross-section through FIG. 2. FIG. 6 is also a cross-section through FIG. 7, as designated by section line 6a—6a.) The pivot pins 152, 154 by which the jaws 80, 82 are pinned to the boss 150 provide for rotation and no linear movement of the jaws 80, 82. Rotation occurs around pivot axes 164, 166 parallel to the longitudinal axis 24. Thus, linear advancement of the piston 92 causes pivoting movement of the links 140, 142 in the general direction of arrows 156, 158 in FIG. 7, causing pivoting of the jaws 80, 82, in the direction of arrows 160, 162 in FIG. 7, around pivot axes 164, 166 in FIG. 8.

Radial needle bearings 168, thrust washers 170, 172, thrust bearings 174, seals 176, 178, pins 180, and retaining screws and washers 182, 184 complete mounting of the jaws 80, 82 to the link members 140, 142 and boss 150.

Referring to FIGS. 8-10, clip jaw 82 includes a pneumatically driven cut-off knife 186, driven in a slot 187 by a knife piston and rod 188. The piston and rod 188 advances and retracts under action of air pressure fed into ports 190, 192, respectively. Bumpers 194, 196, seals such as 198, 200, 202 and a cylinder cap 204 with fasteners 206 complete the assembly. Both jaws 80, 82 define pivot pin bores 208 and link screw bores 210 for pins 152, 154 and screws 182, respectively. Jaw 82 also incorporates a clip channel block 212, a bumper 214, and a bumper retainer 216; jaw 80 incorporates die pocket covers 218.

Action of the knife 186 is co-ordinated with action of the pistons 76, 78 by conventional pneumatic controls to result in a sequence of operation of clip jaw advance, punch full advance, knife advance, knife retraction, partial punch retraction and full punch and clip jaw retraction.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. In a packaging machine for applying clips to rope sections of filled tubular casing to form chubs, the path of movement of the filled tubular casing defining a longitudinal axis, an improved clipping mechanism comprising:

a support structure, the support structure defining a first cylinder, the first cylinder extending transversely relative to the longitudinal axis;

a first piston member in the first cylinder, the first piston member being movable transversely in the first cylinder, and further having an internal, second cylinder inside the first piston, the second cylinder also extending transversely;

clip jaw members pivotally mounted to the support structure for pivoting relative to the support structure toward each other to and from a closed position;

a die member for clip deformation on one of the clip jaw members;

mechanical link members, the mechanical link members pivotally mounted to the first piston member, for movement with the first piston member, and pivotally attached to the clip jaw members for driving the pivoting of the clip jaw members relative to the support structure;

a second piston member in the second cylinder, the second piston member being movable transversely in the second cylinder;

a punch affixed to the second piston member for transverse movement with the second piston member, into and out of cooperative interaction with the die member while the clip jaw members are in the closed position; and means for pressurizing the first and second cylinders in coordination to move the first and second pistons in the first and second cylinders in coordination, to advance the clip jaw members to the closed position and thereafter to drive the punch into cooperative interaction with the die;

whereby clips successively fed to the mechanism are driven under action of the punch around successive rope sections of the filled tubular casing and deformed to clip the rope sections; and whereby the clip jaw members and punch are intermittently retractable during passage of filled tubular casing along the path of movement, to provide for such movement.

2. An improved clipping mechanism for applying clips to filled tubular casing to form chubs, movement of the filled tubular casing defining a longitudinal axis, the improved clipping mechanism comprising:

a support structure, the support structure defining a first cylinder, the first cylinder extending transversely relative to the longitudinal axis;

a first piston member in the first cylinder, the first piston member being movable transversely in the first cylinder, and further having an internal, second cylinder inside the first piston, the second cylinder also extending transversely;

clip jaw members pivotally mounted to the support structure for pivoting relative to the support structure toward each other to and from a closed position;

a die member for clip deformation on one of the clip jaw members;

mechanical link members, the mechanical link members pivotally mounted to the first piston member, for movement with the first piston member, and pivotally attached to the clip jaw members for driving the pivoting of the clip jaw members relative to the support structure;

a second piston member in the second cylinder, the second piston member being movable transversely in the second cylinder;

a punch affixed to the second piston member for transverse movement with the second piston member, into and out of cooperative interaction with the die member while the clip jaw members are in the closed position; and means for pressurizing the first and second cylinders in coordination to move the first and second pistons in the first and second cylinders in coordination, to advance the clip jaw members to the closed position and thereafter to drive the punch into cooperative interaction with the die;

whereby clips successively fed to the mechanism are driven under action of the punch around successive rope sections of the filled tubular casing and deformed to clip the rope sections; and whereby the clip jaw members and punch are intermittently retractable during passage of filled tubular casing along the path of movement, to provide for such movement.

3. A clipping mechanism as in claim 1 or 2 in which the means for pressurizing the first and second cylinders in coordination comprises pneumatic means for intermittently supplying pressurized air to the first and second cylinders in coordination.

4. A clipping mechanism as in claim 1 or 2 in which the punch is transversely elongated along a transverse axis, and in which the first and second cylinders are concentrically aligned along the transverse axis of punch elongation.

5. A clipping mechanism as in claim 4 in which the clip jaw members are mounted to the frame for pivoting relative to the frame about axes parallel to the longitudinal axis, equidistant from the longitudinal axis, and perpendicular to and equidistant from the transverse axis.

6. A clipping mechanism as in claim 5 in which each clip jaw member includes a partial punch guide, the partial punch guides cooperating to guide the punch when the clip jaw members are in the closed position and the punch is moving toward a rope section of the filled tubular casing.

7. A clipping mechanism as in claim 1 or 2 further comprising first piston member guide pins affixed to the support structure and first piston member guide slots through which the guide pins pass, the guide pins guiding transverse movement of the first piston member.

8. A clipping mechanism as in claim 1 or 2 further comprising first spring return means abutting the support structure and first piston member for returning the first piston member to a position retracted from the filled tubular casing.

9. A clipping mechanism as in claim 1 or 2 further comprising second spring return means abutting the support structure and second piston member for returning the second piston member to a position retracted from the filled tubular casing.

10. A clipping mechanism as in claim 1 or 2 in which the first piston member includes a proximal end toward the filled tubular casing and a punch support for supporting the punch within the proximal end.

11. A clipping mechanism as in claim 1 or 2 further comprising a cutoff knife means for cutting rope sections of the filled tubular casing mounted to a clip jaw member.

12. In a packaging machine for applying clips to rope sections of filled tubular casing to form chubs, by deformation of the clips around the rope sections, the path of movement of the filled tubular casing defining a longitudinal axis, an improved clipping mechanism comprising:

a support structure including a main support assembly and an upper cylinder assembly, the main support assembly defining a throat for passage of the filled tubular casing through the support structure, the throat defining the location for deformation of clips around the rope sections, the upper cylinder assembly defining a first, outer cylinder within the upper cylinder assembly, the first cylinder extending transversely relative to the longitudinal axis along an axis passing through the throat;

a first piston member in the first cylinder, the first piston member being a clip-jaw-driving cylinder-piston movable transversely in the first cylinder toward and away from the throat, the cylinder-piston including a cylinder-piston connector plug toward the throat and a cylinder-piston plug opposite the cylinder-piston connector plug, and further having an internal, second cylinder inside the first piston, the second cylinder also extending transversely relative to the longitudinal axis and extending along the axis passing through the throat, the cylinder-piston connector plug including link bosses for attachment of hereinafter-defined mechanical link members;

clip jaw members pivotally mounted to the main support assembly for pivoting about axes parallel to the longitudinal axis relative to the support structure toward each other to and from a closed position at the throat;

a die member for clip deformation on one of the clip jaw members positioned to be adjacent the throat on closure of the clip jaw members;

mechanical link members, the mechanical link members pivotally mounted to the first piston member, for movement with the first piston member, and pivotally attached to the clip jaw members for driving the pivoting of the clip jaw members relative to the support structure;

a second piston member in the second cylinder, the second piston member being a punch piston, and being movable transversely in the second cylinder, the punch piston having a punch thrust plate toward the throat;

a pair of punches affixed to the punch thrust plate of the punch piston, for transverse movement with the punch piston, into and out of cooperative interaction with the die member while the clip jaw members are in the closed position; and means for pressurizing the first and second cylinders in coordination to move the first and second pistons in the first and second cylinders in coordination, to advance the clip jaw members to the closed position and thereafter to drive the punch into cooperative interaction with the die;

whereby clips successively fed to the mechanism are driven under action of the punch around successive rope sections of the filled tubular casing and deformed to clip the rope sections; and whereby the clip jaw members and punch are intermittently retractable during passage of filled tubular casing along the path of movement, to provide for such movement.

* * * * *